(12) United States Patent
Heisele et al.

(10) Patent No.: US 8,422,797 B2
(45) Date of Patent: Apr. 16, 2013

(54) OBJECT RECOGNITION WITH 3D MODELS

(75) Inventors: Bernd Heisele, Mountain View, CA (US); Gunhee Kim, Pittsburgh, PA (US); Andrew J. Meyer, Cambridge, MA (US)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 12/827,185

(22) Filed: Jun. 30, 2010

(65) Prior Publication Data
US 2011/0002531 A1 Jan. 6, 2011

Related U.S. Application Data

(60) Provisional application No. 61/222,245, filed on Jul. 1, 2009.

(51) Int. Cl.
*G06K 9/62* (2006.01)

(52) U.S. Cl.
USPC .................................. 382/224; 382/159

(58) Field of Classification Search .......... 382/155, 382/159, 160, 224, 228; 345/418–427
See application file for complete search history.

(56) References Cited

U.S. PATENT DOCUMENTS

| | | | |
|---|---|---|---|
| 5,675,711 A * | 10/1997 | Kephart et al. | 706/12 |
| 6,421,463 B1 | 7/2002 | Poggio et al. | |
| 6,807,286 B1 * | 10/2004 | Krumm et al. | 382/103 |
| 7,418,128 B2 | 8/2008 | Simard et al. | |
| 7,480,414 B2 | 1/2009 | Brown et al. | |
| 7,646,909 B2 * | 1/2010 | Jiang et al. | 382/154 |
| 7,711,155 B1 * | 5/2010 | Sharma et al. | 382/118 |
| 7,711,174 B2 | 5/2010 | Sammak et al. | |
| 7,756,325 B2 | 7/2010 | Vetter et al. | |
| 7,804,990 B2 * | 9/2010 | Kiraly et al. | 382/128 |
| 7,853,072 B2 * | 12/2010 | Han et al. | 382/155 |
| 8,019,702 B1 * | 9/2011 | Gargi et al. | 706/12 |
| 2005/0286772 A1 * | 12/2005 | Albertelli | 382/224 |
| 2006/0039593 A1 * | 2/2006 | Sammak et al. | 382/133 |
| 2006/0050953 A1 * | 3/2006 | Farmer et al. | 382/159 |
| 2007/0031028 A1 * | 2/2007 | Vetter et al. | 382/154 |
| 2007/0276776 A1 | 11/2007 | Sagher et al. | |

OTHER PUBLICATIONS

Huang, Jennifer, Component-based Face Recognition with 3D Morphable Models, Dec. 15, 2002, MIT.*

(Continued)

*Primary Examiner* — Samir Ahmed
*Assistant Examiner* — Totam Le
(74) *Attorney, Agent, or Firm* — Fenwick & West LLP; Mark E. Duell

(57) ABSTRACT

An "active learning" method trains a compact classifier for view-based object recognition. The method actively generates its own training data. Specifically, the generation of synthetic training images is controlled within an iterative training process. Valuable and/or informative object views are found in a low-dimensional rendering space and then added iteratively to the training set. In each iteration, new views are generated. A sparse training set is iteratively generated by searching for local minima of a classifier's output in a low-dimensional space of rendering parameters. An initial training set is generated. The classifier is trained using the training set. Local minima are found of the classifier's output in the low-dimensional rendering space. Images are rendered at the local minima. The newly-rendered images are added to the training set. The procedure is repeated so that the classifier is retrained using the modified training set.

20 Claims, 4 Drawing Sheets
(1 of 4 Drawing Sheet(s) Filed in Color)

OTHER PUBLICATIONS

Bulthoff, Heinrich, "View-based dynamic Object Recognition based on Human Perception", 2002, In Proc. Int. Conf. Pattern Recognition, vol. III, pp. 768-776.*

Nguyen, Minh Hoai and de la Torre, Fernando, "Learning Image Alignment without Local Minima for Face Detection and Tracking", 2008, Robotics Institute, Paper 142 (http://repository.cmu.edu/robotics/142/).*

PCT International Search Report and Written Opinion, PCT Application No. PCT/US2010/040678, Aug. 23, 2010, five pages.

Blanz, V. et al., "Comparison of View-based Object Recognition Algorithms Using Realistic 3D Models," International Conference on Artificial Neural Networks, 1996, pp. 251-256, Berlin, Germany.

Blanz, V. et al., "Face Identification Across Different Poses and Illuminations with a 3D Morphable Model," Conference on Automatic Face and Gesture Recognition (FG), 2002, pp. 202-207.

Blender Foundation, "Blender 2.48," Jul. 2010 [Online] [Retrieved on Jul. 27, 2010] Retrieved from the Internet <URL: http://www.blender.org/development/release-logs/blender-248/>.

Bricolo, E. et al., "3D Object Recognition: A Model of View-Tuned Neurons," Advances in Neural Information Processing Systems (NIPS), 1996, pp. 41-47.

Chang, C. et al., "LIBSVM: a Library for Support Vector Machines," Mar. 2010 [Online] [Retrieved on Jul. 28, 2010] Retrieved from the Internet <URL: http://www.csie.ntu.edu.tw/~cjlin/papers/libsvm.pdf>.

Chapelle, O., "Training a Support Vector Machine in the Primal," in Large Scale Kernel Machines, 2007, pp. 33-56, MIT Press, Cambridge, MA, USA.

Cyr, C. et al., "3D Object Recognition Using Shape Similarity-Based Aspect Graph," International Conference on Computer Vision (ICCV), 2001, pp. 254-261.

Dalal, N. et al., "Histograms of Oriented Gradients for Human Detection," IEEE Conference on Computer Vision and Pattern Recognition (CVPR), 2005, pp. 886-893.

Everingham, M. et al., "The PASCAL Visual Object Classes Challenge 2008 (VOC2008) Results", [Online] [Retrieved on Jul. 27, 2010] Retrieved from the Internet <URL: http://pascallin.ecs.soton.ac.uk/challenges/VOC/voc2008/results/index.shtml>.

Fei-Fei, L. et al., "Learning Generative Visual Models from Few Training Examples: An Incremental Bayesian Approach Tested on 101 Object Categories," IEEE CVPR, Workshop on Generative-Model Based Vision (GMBV), 2004.

Griffin, G. et al., "Caltech-256 Object Category Dataset" (Technical Report 7694; CNS-TR-2007-1), California Institute of Technology, 2007, 20 pages.

Hein, M. et al., "GraphDemo: A Matlab GUI to Explore Similarity Graphs and Their Use in Machine Learning," Apr. 2008 [Online] [Retrieved on Jul. 27, 2010] Retrieved from the Internet <URL: http://www.ml.uni-saarland.de/GraphDemo/GraphDemo.html>.

Heisele, B. et al., "Object Recognition with 3D Models," Proceedings of the 2009 British Machine Vision Conference (BMVC), Sep. 7-10, 2009, 11 pages, London, England.

Heisele, B. et al. "Morphable Models for Training a Component-Based Face Recognition System," in Face Processing, Advanced Modeling and Methods, Chapter 14, 2006, pp. 439-462, Elsevier.

Lagarias, J. et al., "Convergence Properties of the Nelder-Mead Simplex Method in Low Dimensions," Society for Industrial and Applied Mathematics (SIAM), 1998, vol. 9, No. 1, pp. 112, 115-117, 146-147.

Lecun, Y. et al., "Learning Methods for Generic Object Recognition with Invariance to Pose and Lighting," IEEE Conference on Computer Vision and Pattern Recognition (CVPR), 2004, pp. 97-104.

Liebelt, J. et al., "Viewpoint-Independent Object Class Detection Using 3D Feature Maps," IEEE Conference on Computer Vision and Pattern Recognition (CVPR), 2008, pp. 1-8.

Lowe, D.G., "Distinctive Image Features from Scale-Invariant Keypoints," International Journal of Computer Vision, 2004, vol. 60, No. 2, pp. 91-110.

Mathworks, Inc., The, "MATLAB Function Reference: fminsearch," [Online] [Retrieved on Aug. 23, 2010] Retrieved from the Internet <URL: http://www.mathworks.com/access/helpdesk/help/techdoc/ref/fminsearch.html>.

Nelder, J.A. et al., "A Simplex Method for Function Minimization," The Computer Journal, Jan. 1965, vol. 7, No. 4, pp. 308-313.

Pinto, N. et al., "Why is Real-World Visual Object Recognition Hard?," PLoS Computational Biology, Jan. 2008, vol. 4, Issue 1, pp. 0151-0156.

Python Software Foundation, "Python v2.6.1 Documentation," Dec. 20, 2008, [Online] [Retrieved on Jul. 27, 2010] Retrieved from the Internet <URL: http://docs.python.org/release/2.6.1/>.

Roobaert, D., "Pedagogical Support Vector Learning: A Pure Learning Approach to Object Recognition," Stockholm University, Dissertation, May 2001, Computational Vision and Active Perception Laboratory (CVAP), 167 pages.

Russell, B. et al., "LabelMe: A Database and Web-Based Tool for Image Annotation," Technical Report, 2005, Massachusetts Institute of Technology.

Schneiderman, H. et al., "A Statistical Method for 3D Object Detection Applied to Faces and Cars," IEEE Conference on Computer Vision and Pattern Recognition, 2000, pp. 746-751.

Shi, J. et al., "Normalized Cuts and Image Segmentation," IEEE Transactions on Pattern Analysis and Machine Intelligence, Aug. 2000, vol. 22, No. 8, pp. 888-905.

Sung, K. et al., "Example-Based Learning for View-Based Human Face Detection," IEEE Transactions on Pattern Analysis and Machine Intelligence, Jan. 1998, vol. 20, No. 1, pp. 39-51.

Sung, K., "Learning and Example Selection for Object and Pattern Detection," MIT Artificial Intelligence Laboratory, Jan. 1996, A.I.T.R. No. 1572, 195 pages.

Vapnik, V., "Statistical Learning Theory," 1998, John Wiley & Sons, Inc., New York, NY, USA, pp. vii-xix, 1-15.

Viola, P. et al., "Rapid Object Detection Using a Boosted Cascade of Simple Features," IEEE Conference on Computer Vision and Pattern Recognition (CVPR), 2001, pp. 511-518.

Von Ahn, L. et al., "Labeling Images with a Computer Game," SIGCHI Conference on Human Factors in Computing Systems, Apr. 24-29, 2004, pp. 319-326, Vienna, Austria.

YAFARAY.ORG, "YafaRay Version 0.1.1 User's Guide," 2009 [Online] [Retrieved on Jul. 27, 2010] Retrieved from the Internet <URL: http://static.yafaray.org/guide/YafaRay_011_guide.zip>.

Yan, P. et al., "3D Model Based Object Class Detection in an Arbitrary View," IEEE International Conference on Computer Vision (ICCV), 2007, pp. 1-6.

\* cited by examiner

OBJECT RECOGNITION WITH 3D MODELS

RELATED APPLICATION

This application claims priority from U.S. provisional application No. 61/222,245, filed Jul. 1, 2009, entitled "Object Recognition with 3D Models", which is incorporated by reference herein in its entirety.

FIELD OF THE INVENTION

The present invention relates to machine vision, including object recognition. More particularly, the present invention relates to training classifiers to perform view-based object recognition.

BACKGROUND OF THE INVENTION

Over the past few years, the object recognition community has taken on the challenge of developing systems that learn to recognize hundreds of object classes from a few examples per class. The standard data sets used for benchmarking these systems contained, in average, fewer than two hundred images per class (as opposed to sets of thousands of meticulously segmented object images that were used in earlier work on object detection). Benchmarking on such small data sets is inherently problematic. The test results cannot be generalized and can be misleading.

There have been efforts of building larger databases of manually annotated, natural images. However, the somewhat arbitrary selection of images and the missing ground truth make it difficult to systematically analyze specific properties of object recognition systems, such as invariance to pose, scale, position, and illumination. A database for shape-based object recognition which addresses these issues is NORB from the Courant Institute at New York University. Pictures of objects were taken with consideration of viewpoint and illumination. The images were synthetically altered to add more image variations, such as object rotation, background, and "distractors".

Taking the idea of controlling the image generation one step further takes us to fully synthetic images rendered from realistic three-dimensional (3D) computer graphics models. Some view-based object recognition systems have been trained and evaluated on synthetic images. At least one face recognition system and one object recognition system have been trained on views of 3D models and tested on real images. 3D models have also been used in a generative approach to object recognition in which rendering parameter values are optimized such that the synthetic image best matches a given photographic image. To avoid getting trapped in local minima, this analysis-through-synthesis approach requires a good initial estimate of the rendering parameter values, making it unsuited to many object recognition/detection tasks.

SUMMARY OF THE INVENTION

A view-based object recognition system uses a model of an object's appearance in order to determine whether the object is present in a given image. The view-based object recognition system generates ("learns") the model when the system is trained using a training data set. The training data set includes images that are positive examples (i.e., the target object is present) and images that are negative examples (i.e., the target object is absent). Each training image is labeled correctly regarding whether it is a positive example or a negative example.

Like any other image, a training image can be either natural or synthetic. A natural image faithfully represents the appearance of a real-world object and is generated by, for example, taking a picture of the object using a camera or other image sensor. A synthetic image is any image other than a natural image. For example, a computer-aided design (CAD) model is rendered to generate the synthetic image. Training a view-based object recognition system using synthetic images (as opposed to natural images) has several advantages.

An "active learning" method is presented, in which the generation of synthetic training images is controlled within an iterative training process. (The term "active learning" is used herein to refer to a learning method that actively generates its own training data.) The primary idea of active learning is to find valuable and/or informative object views in a low-dimensional rendering space and then add these views iteratively to the training set. In each iteration, instead of "bootstrapping" the classifier (by adding particular sample images from a given database of images), new views are generated. A sparse training set is iteratively generated by searching for local minima of a classifier's output in a low-dimensional space of rendering parameters.

In one embodiment, an active learning method trains a compact classifier for view-based object recognition. An initial training set is generated. The classifier is trained using the training set. Local minima are found of the classifier's output in the low-dimensional rendering space. Images are rendered at the local minima. The newly-rendered images are added to the training set. The procedure is repeated so that the classifier is retrained using the modified training set.

The features and advantages described in the specification are not all inclusive and, in particular, many additional features and advantages will be apparent to one of ordinary skill in the art in view of the drawings, specification, and claims.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

Figure 1:
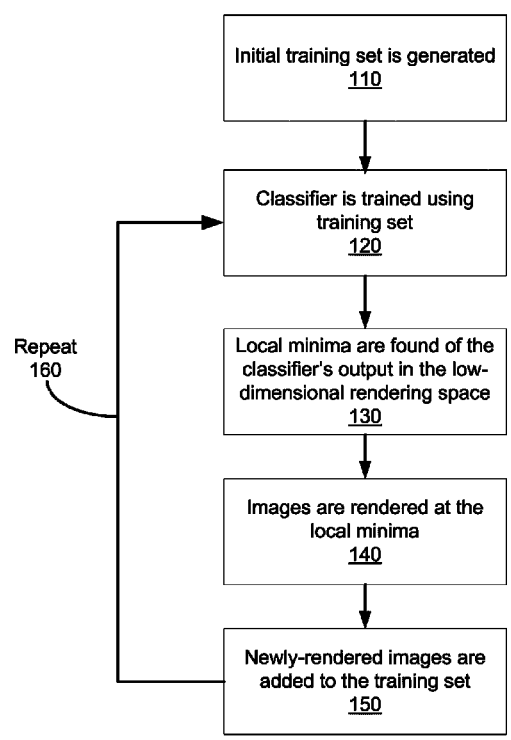
FIG. 1 is a flowchart of an active learning method that trains a compact classifier for view-based object recognition, according to one embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Various embodiments are now described with reference to the figures where like reference numbers indicate identical or functionally similar elements. Also in the figures, the leftmost digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like refer to the action and processes of a computer system, or similar electronic computing device (such as a specific computing machine), that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware and, when embodied in software, could be downloaded to reside on and be operated from different platforms used by a variety of operating systems. The invention can also be in a computer program product that can be executed on a computing system.

The present invention also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes and may not have been selected to delineate or circumscribe the inventive subject matter. Accordingly, the disclosure of the present invention is intended to be illustrative, but not limiting, of the scope of the invention, which is set forth in the claims.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

A view-based object recognition system uses a model of an object's appearance in order to determine whether the object is present in a given image. The model represents the object's appearance in an image under various conditions (e.g., different poses and/or illuminations). The view-based object recognition system generates ("learns") the model when the system is trained using a training data set. The training data set includes images that are positive examples (i.e., the target object is present) and images that are negative examples (i.e., the target object is absent). Each training image is labeled correctly regarding whether it is a positive example or a negative example.

Like any other image, a training image can be either natural or synthetic. A natural image faithfully represents the appearance of a real-world object and is generated by, for example, taking a picture of the object using a camera or other image sensor. A synthetic image is any image other than a natural image. One type of synthetic image is generated based on a natural image. For example, the natural image is distorted or transformed in some way to generate the synthetic image. Another type of synthetic image is generated independently of a natural image. For example, a computer-aided design (CAD) model is rendered to generate the synthetic image. In order to distinguish between these two types of synthetic images, the first type will be referred to as partially-synthetic (since it was generated based on a natural image), and the second type will be referred to as fully-synthetic (since it was generated independently of a natural image).

Training a view-based object recognition system using synthetic images (as opposed to natural images) has several advantages. First of all, large numbers of training images can be generated automatically. Also, full control is available over image generation parameters, including internal and external camera parameters, illumination, composition of the scene, and animation of the scene. Finally, ground truth is known for the location, scale, and orientation of each object. In video sequences, the frame rate, the camera motion, and the motion of objects are known.

Supervised machine learning methods, such as statistical classifiers, have been used to address the problem of view-based object recognition. Consider training a view-based classifier using fully-synthetic training images (e.g., images generated based on three-dimensional (3D) models). The training will likely face two problems. First, the training set will be very large, which can break the learning algorithm. Second, the solutions are not sparse, so the classifiers will be slow at run-time. One of the largest groups of modern machine learning algorithms is the group of kernel-based machine learning algorithms, which includes support vector machines (amongst others). It is possible to compute a quadratic matrix of size N×N where N is the number of samples that can "break" a kernel-based machine learning algorithm (see O. Chapelle, "Training a Support Vector Machine in the Primal", Neural Computation, Vol. 19, No. 5, pp. 1155-1178, March 2007). A large number of samples will also make training slow, since the time complexity in kernel algorithms is polynomial in the number of samples. The complexity at runtime is also affected for support vector machines (and possibly for other kernel-based algorithms as well). The number of training data points that are used in computing the classification result increases linearly with the size of the training set. Basically, runtime complexity during classification is linear in training sample size. What is needed is a technique that can train (e.g., build or compute) compact classifiers from sparse data sets.

An "active learning" method is now presented, in which the generation of synthetic training images is controlled within an iterative training process. (Note that the term "active learning" in the machine learning community refers to learning from data with hidden labels. The term "active learning" is used herein to refer to something different—namely, a learning method that actively generates its own training data.) The primary idea of active learning is to find valuable and/or informative object views in a low-dimensional rendering space and then add these views iteratively to the training set. In each iteration, instead of "bootstrapping" the classifier (by adding particular sample images from a given database of images), new views are generated. A sparse training set is iteratively generated by searching for local minima of a classifier's output in a low-dimensional space of rendering parameters.

FIG. 1 is a flowchart of an active learning method that trains a compact classifier for view-based object recognition, according to one embodiment of the invention. In step 110, an initial training set is generated. In step 120, the classifier is trained using the training set. In step 130, local minima are found of the classifier's output in the low-dimensional rendering space. In step 140, images are rendered at the local minima. In step 150, the newly-rendered images are added to the training set. In step 160, the procedure is repeated starting from step 120, so that the classifier is retrained using the modified training set.

Figure 2:
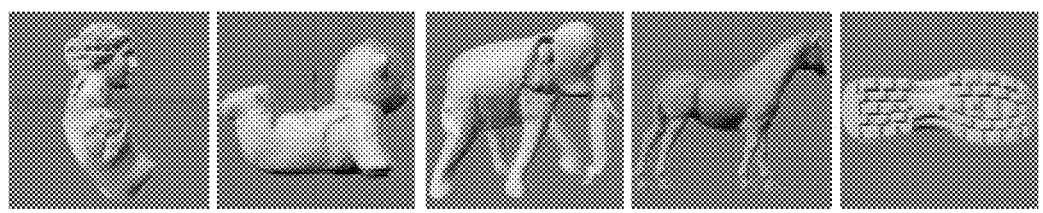
FIG. 2 shows five computer graphics models, according to one embodiment of the invention.
Figure 3:
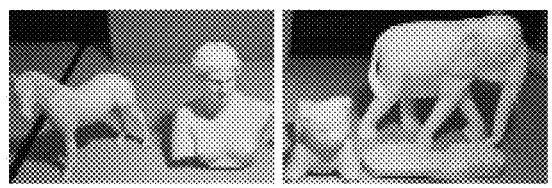
FIG. 3 shows photographs of the printed versions of the five models of FIG. 2, according to one embodiment of the invention.

Steps 110-160 are further explained below in conjunction with an example of a classification task and a system for performing the active learning method of FIG. 1. In this example, object recognition is performed for five classes of objects. Each object is represented by a texture-less 3D model with 30,000 surface triangles. FIG. 2 shows the five computer graphics models, according to one embodiment of the invention. In FIG. 2, the illustrated models represent (from left to right) a bust of the goddess Aphrodite, a bear lying down, an elephant standing up, a horse standing up, and a shoe sole. Each of the five models is also printed on a 3D printer in order to be able to test the object recognition system on natural images. FIG. 3 shows photographs of the five printed models, according to one embodiment of the invention.

In this example, to generate an image (either synthetic or natural), a camera viewpoint (either virtual or actual) is moved on a sphere around the model, pointing towards the model's center. The model is illuminated by a point light source (which can be positioned on a sphere around the model) and by ambient light. This image generation setup results in a low-dimensional rendering space (specifically, a six-dimensional rendering space). The six rendering parameters are: 1) the viewpoint's location in azimuth, 2) the viewpoint's location in elevation, 3) the viewpoint's rotation around its optical axis, 4) the point light source's location in azimuth, 5) the point light source's location in elevation, and 6) the intensity ratio between the ambient light and the point light source.

Figure 4:
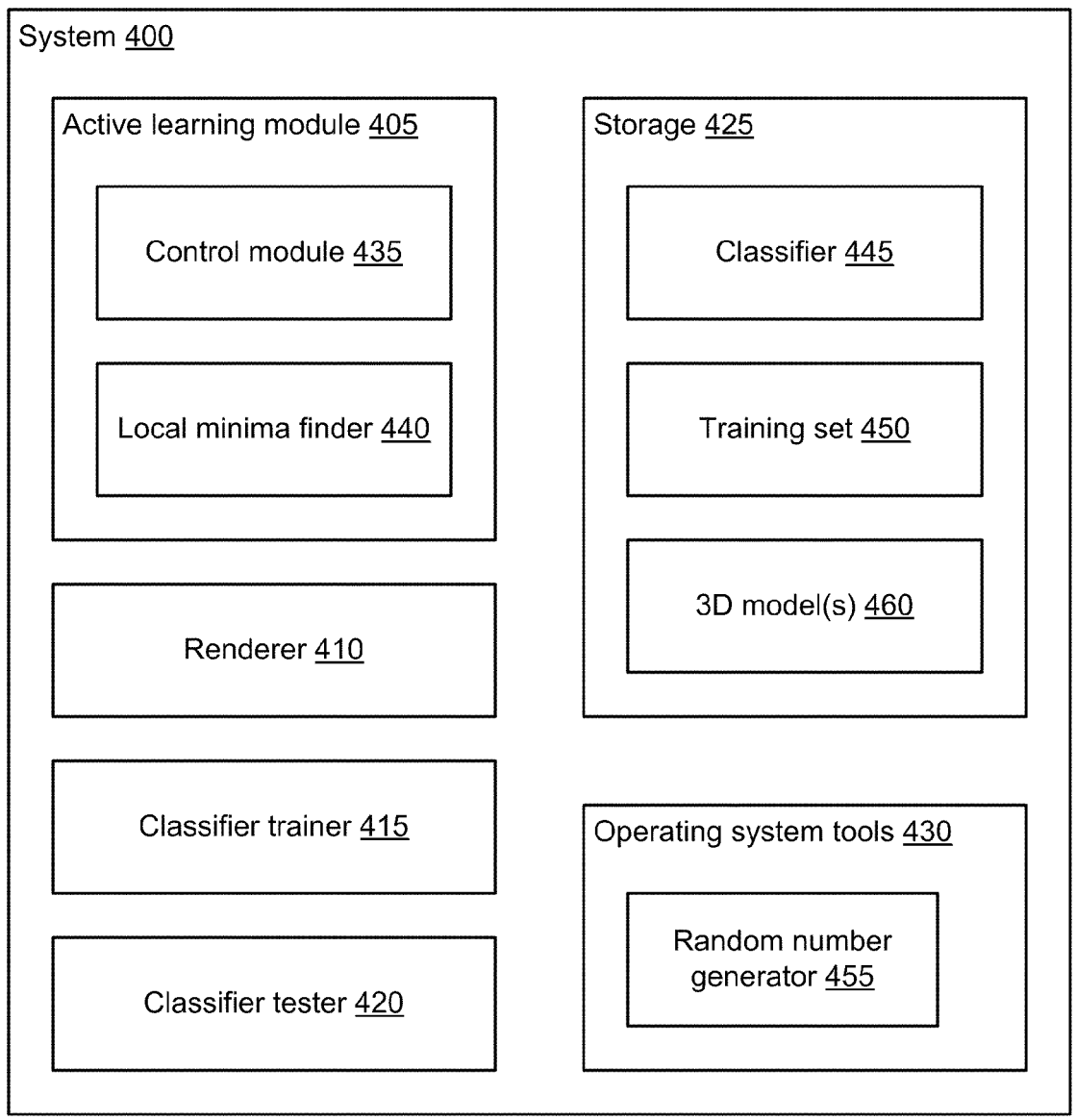
FIG. 4 is a block diagram of a system for performing the active learning method of FIG. 1, according to one embodiment of the invention.

FIG. 4 is a block diagram of a system for performing the active learning method of FIG. 1, according to one embodiment of the invention. The system 400 is able to train a compact classifier for view-based object recognition. The illustrated system 400 includes an active learning module 405, a renderer 410, a classifier trainer 415, a classifier tester 420, storage 425, and operating system tools 430.

In one embodiment, the active learning module 405 (and its component modules), the renderer 410, the classifier trainer 415, the classifier tester 420, and the operating system tools 430 are one or more computer program modules stored on one or more computer readable storage mediums and executing on one or more processors. The storage 425 (and its contents) is stored on one or more computer readable storage mediums. Additionally, the active learning module 405 (and its component modules), the renderer 410, the classifier trainer 415, the classifier tester 420, the operating system tools 430, and the storage 425 are communicatively coupled to one another to at least the extent that data can be passed between them. In one embodiment, the operating system tools 430 are executing as one or more parts of an operating system on a personal computer, and the active learning module 405, the renderer 410, the classifier trainer 415, and the classifier tester 420 are executing on the same personal computer.

The illustrated storage 425 stores a classifier 445, a training set 450, and one or more 3D models 460. The classifier 445 is a statistical classifier such as a support vector machine (SVM) or a nearest-neighbor classifier. In one embodiment, the classifier 445 is a SVM with a Gaussian kernel. The SVM parameter values are optimized in initial experiments and then kept fixed throughout (e.g., s=2:0 and C=10, where s represents the kernel width and C represents the error cost). SVMs are further described in V. Vapnik, Statistical Learning Theory, Wiley-Interscience, 1998. Implementations of SVMs include, for example, the LIBSVM library (C.-C. Chang et al., "LIBSVM: a Library for Support Vector Machines", 2001).

The classifier 445 operates using a vector of image feature values ("feature vector"). Any image feature can be used, such as gray-values, normalized gray-values, or histograms of gradients. In one embodiment, orientation histograms or histograms of gradients are used for the feature vector. The histograms are computed at five fixed locations within a 23×23 image, resulting in a 640-dimensional feature vector that is normalized to unit length. The 128-dimensional histograms are computed at the following (x/y) locations: (9/9), (15/9), (12/12), (9/15), and (15/15).

The classifier 445 can be trained using the classifier trainer 415 and tested using the classifier tester 420.

The training set 450 is a set of images that are used to train the classifier 445 using the classifier trainer 415. An image in the training set 450 is a synthetic image that was generated by using the renderer 410 to render a 3D model 460.

A 3D model 460 is a model of a three-dimensional object and can be rendered using the renderer 410 to produce a synthetic image.

The operating system tools 430 include a random number generator 455. The random number generator 455 can generate a random (or pseudo-random) number.

The renderer 410 is a conventional software application that can render a 3D model 460, such as Blender (an open source software package for 3D modeling and rendering). The renderer 410 renders a model 460 based on a set of rendering parameter values. In the example introduced above, there are six rendering parameters (the viewpoint's location in azimuth and elevation, the viewpoint's rotation around its optical axis, the point light source's location in azimuth and elevation, and the intensity ratio between the ambient light and the point light source).

Figure 5:
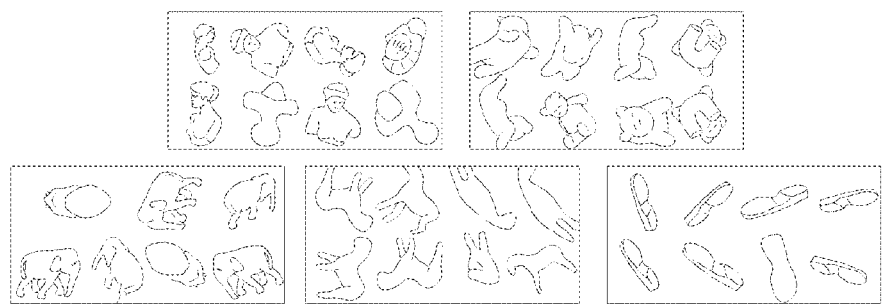
FIG. 5 shows examples of rendered images after scaling and smoothing, according to one embodiment of the invention.

In one embodiment, the renderer 410 renders a 3D model 460 at a resolution of 100×100 pixels. The renderer 410 also scales and smoothes the rendered (synthetic) image, resulting in a 23×23 pixel gray-value (synthetic) image. FIG. 5 shows examples of the rendered (synthetic) images after scaling and smoothing, according to one embodiment of the invention.

The classifier trainer 415 is a conventional software application that can train a classifier 445 given a training set 450 (e.g., a set of training images).

The classifier tester 420 is a conventional software application that can test a classifier 445 to determine the classifier's classification accuracy. In one embodiment, the classifier 445 is tested using 40,000 views per class, where each view is randomly drawn from the low-dimensional space of rendering parameters. The classifier's output is computed, using the real-valued output of the SVM. (For samples of the negative class (label "−1"), the output is multiplied by −1.) The most difficult views from each class are determined (e.g., the 100 views with the lowest accuracy rates).

The active learning module 405 includes a control module 435 and a local minima finder 440. The control module 435 controls the operation of the active learning module 405 so that the active learning module 405 can train a compact classifier 445 for view-based object recognition. The control module 435 is further described below with reference to FIG. 1.

Figure 6:
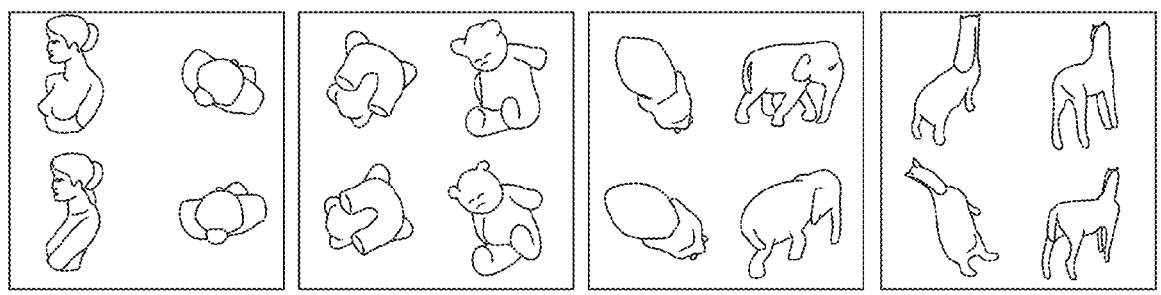
FIG. 6 shows examples of initially-selected views and views at nearby local minima, according to one embodiment of the invention.

The local minima finder 440 finds local minima (and the associated rendering parameter values) of a classifier's output in a low-dimensional rendering space. A set of views (e.g., the 100 most difficult views from each class) are used as starting points of an optimization algorithm (e.g., the Nelder-Mead simplex algorithm). Note that the values of the six rendering parameters are already known for every view. A number of iterations of the algorithm (e.g., ten) are computed in order to find local minima (and the associated rendering parameter values) of the classifier's output in the rendering space. The classifier's output is computed, using the real-valued output of the SVM. (For samples of the negative class (label "−1"), the output is multiplied by −1.) FIG. 6 shows examples of the initially-selected (i.e., starting point) views and the views at the nearby local minima, according to one embodiment of the invention. In FIG. 6, example pairs are vertically arranged with the initial views on top and the views at nearby local minima on the bottom.

In general, active learning achieves the same error rate (e.g., equal error rate or "EER") with significantly smaller training sets and significantly fewer support vectors than training on a random selection of object views. In other words, active learning trains a "compact" classifier.

Returning to FIG. 1, in step 110, an initial training set 450 is generated, where the initial training set 450 includes one or more synthetic images. Each synthetic image is generated by the renderer 410 based on a 3D model 460 and a set of rendering parameter values. In one embodiment, the initial training set 450 is comprised of randomly selected samples from the low-dimensional space of rendering parameters.

In one embodiment, the control module 435 performs step 110. For example, the control module 435 uses the random number generator 455 to obtain one randomly-selected value for each of the rendering parameter values. (In the example introduced above, there are six rendering parameters, so each randomly-selected sample has one randomly-selected value for each of these six parameters.) The control module 435 then uses the renderer 410 to generate a synthetic image of a 3D model 460 based on the rendering parameter values. The synthetic image is then added to the initial training set 450. In one embodiment, the initial training set 450 includes 200 samples per class (e.g., 200 synthetic images per 3D model 460).

In step 120, the classifier 445 is trained using the training set 450. In one embodiment, the control module 435 performs step 120. For example, the control module 435 uses the classifier trainer 415 to train the classifier 445 using the training set 450. The first time that step 120 is executed, the training set 450 is the initial training set. The second and subsequent times that step 120 is executed, the training set 450 will have been modified, as explained below in conjunction with step 150.

In step 130, local minima are found of the classifier's output in the low-dimensional rendering space. In one embodiment, the control module 435 performs step 130. For example, the control module 435 first uses the classifier tester 420 to test the classifier 445 and determine the classifier's classification accuracy. The classifier tester 420 determines the most difficult views from each class (e.g., the 100 views with the lowest accuracy rates). The control module 435 then uses the local minima finder 440 to find local minima (and the associated rendering parameter values) of the classifier's output, using the most difficult views as starting points.

In step 140, images are rendered at the local minima (using the associated rendering parameter values). In one embodiment, the control module 435 performs step 140. For example, the control module 435 uses the renderer 410 to render object views (synthetic images) at the local minima that were found in step 130. In one embodiment, 200 object views are rendered. The control module 435 also computes the orientation histograms of the rendered views. The orientation histograms will be used as the object features (i.e., the basis for classification).

In step 150, the newly-rendered images are added to the training set. In one embodiment, the control module 435 performs step 150. For example, the control module 435 adds the newly-rendered images (generated in step 140) to the training set 450 by storing the images appropriately. This generates a modified training set 450 that includes both the images that were rendered in step 140 and the images that were used to train the classifier in step 120.

In step 160, the procedure is repeated starting from step 120, so that the classifier 445 is retrained using the modified training set 450.

Although the invention has been described in considerable detail with reference to certain embodiments thereof, other embodiments are possible as will be understood to those skilled in the art. For example, another embodiment is described in "Object Recognition with 3D Models" by B. Heisele, G. Kim, and A. Meyer, Proceedings of the 2009 British Machine Vision Conference (BMVC), London, England, September 7-10, which is hereby incorporated by reference.

What is claimed is:

1. A computer-implemented method for training a view-based object recognition classifier, comprising:
   generating an initial training set of images, wherein an image in the initial training set is generated based on a three-dimensional model and a set of rendering parameter values, the rendering parameter values comprising at least one of an azimuth location of a viewpoint, an elevation location of a viewpoint, and a rotation of a viewpoint around its optical axis;
   training the classifier using the initial training set;
   determining the classifier's accuracy;
   determining a set of one or more local minima of the classifier's output;
   for each local minimum in the set of local minima:
      determining a set of rendering parameter values associated with the local minimum, the rendering parameter values comprising at least one of an azimuth location of a viewpoint, an elevation location of a viewpoint, and a rotation of a viewpoint around its optical axis; and
      generating an additional image based on the three-dimensional model and the determined set of rendering parameter values;
   training the classifier using the initial training set and the generated additional images.

2. The method of claim 1, wherein the classifier comprises a statistical classifier.

3. The method of claim 1, wherein the classifier comprises a support vector machine.

4. The method of claim 1, wherein the classifier classifies an image based on a feature vector of the image's gradient histograms.

5. The method of claim 1, wherein a rendering parameter additionally comprises one element of a group containing: an azimuth location of a point light source, an elevation location of a point light source, and an intensity ratio between an ambient light and a point light source.

6. The method of claim 1, wherein a value for a rendering parameter for an image in the initial training set is determined randomly or pseudo-randomly.

7. The method of claim 1, wherein an image in the initial training set is associated with a label that specifies whether the image is a positive example or a negative example.

8. The method of claim 1, wherein determining the set of one or more local minima of the classifier's output comprises performing an optimization algorithm.

9. A non-transitory machine-readable storage medium encoded with instructions that, when executed by a processor, cause the processor to perform a method for training a view-based object recognition classifier, comprising:
   generating an initial training set of images, wherein an image in the initial training set is generated based on a three-dimensional model and a set of rendering parameter values, the rendering parameter values comprising at least one of an azimuth location of a viewpoint, an elevation location of a viewpoint, and a rotation of a viewpoint around its optical axis;
   training the classifier using the initial training set;
   determining the classifier's accuracy;
   determining a set of one or more local minima of the classifier's output;
   for each local minimum in the set of local minima:
      determining a set of rendering parameter values associated with the local minimum, the rendering parameter values comprising at least one of an azimuth location of a viewpoint, an elevation location of a viewpoint, and a rotation of a viewpoint around its optical axis; and
      generating an additional image based on the three-dimensional model and the determined set of rendering parameter values;
   training the classifier using the initial training set and the generated additional images.

10. The medium of claim 9, wherein the classifier comprises a statistical classifier.

11. The medium of claim 9, wherein the classifier comprises a support vector machine.

12. The medium of claim 9, wherein the classifier classifies an image based on a feature vector of the image's gradient histograms.

13. The medium of claim 9, wherein a rendering parameter comprises one element of a group containing: an azimuth location of a point light source, an elevation location of a point light source, and an intensity ratio between an ambient light and a point light source.

14. The medium of claim 9, wherein a value for a rendering parameter for an image in the initial training set is determined randomly or pseudo-randomly.

15. The medium of claim 9, wherein an image in the initial training set is associated with a label that specifies whether the image is a positive example or a negative example.

16. The medium of claim 9, wherein determining the set of one or more local minima of the classifier's output comprises performing an optimization algorithm.

17. A system for training a view-based object recognition classifier, comprising:
   a machine-readable storage medium encoded with machine-readable instructions for performing a method, the method comprising:
      generating an initial training set of images, wherein an image in the initial training set is generated based on a three-dimensional model and a set of rendering parameter values, the rendering parameter values comprising at least one of an azimuth location of a viewpoint, an elevation location of a viewpoint, and a rotation of a viewpoint around its optical axis;
      training the classifier using the initial training set;
      determining the classifier's accuracy;
      determining a set of one or more local minima of the classifier's output;
      for each local minimum in the set of local minima:
         determining a set of rendering parameter values, the rendering parameter values comprising at least one of an azimuth location of a viewpoint, an elevation location of a viewpoint, and a rotation of a viewpoint around its optical axis; and
         generating an additional image based on the three-dimensional model and the determined set of rendering parameter values;
      training the classifier using the initial training set and the generated additional images; and
   a processor configured to execute the machine-readable instructions encoded on the machine-readable storage medium.

18. The system of claim 17, wherein a rendering parameter additionally comprises one element of a group containing: an azimuth location of a point light source, an elevation location of a point light source, and an intensity ratio between an ambient light and a point light source.

19. The system of claim 17, wherein a value for a rendering parameter for an image in the initial training set is determined randomly or pseudo-randomly.

20. The system of claim 17, wherein an image in the initial training set is associated with a label that specifies whether the image is a positive example or a negative example.

* * * * *